(12) United States Patent
Becker et al.

(10) Patent No.: US 7,121,375 B2
(45) Date of Patent: Oct. 17, 2006

(54) BELT DEFLECTOR FOR A SEAT BELT IN AN AUTOMOTIVE VEHICLE, MORE SPECIFICALLY IN A CABRIOLET OR A COUPE

(75) Inventors: Burckhard Becker, Solingen (DE); Wilfried Beneker, Leichlingen (DE); Jörg-Max Woelfel, Remscheid (DE)

(73) Assignee: C. Rob Hammerstein GmbH & Co. KG, Solingen (DE)

( * ) Notice: Subject to any disclaimer, the term of this patent is extended or adjusted under 35 U.S.C. 154(b) by 329 days.

(21) Appl. No.: 10/865,091

(22) Filed: Jun. 10, 2004

(65) Prior Publication Data

US 2004/0256167 A1 Dec. 23, 2004

(30) Foreign Application Priority Data

Jun. 13, 2003 (DE) ................ 103 27 091

(51) Int. Cl.
*B60R 21/00* (2006.01)
(52) U.S. Cl. ...................................... 180/268
(58) Field of Classification Search ........... 180/268, 180/271; 280/806, 808; 297/216.1, 216.13, 297/216.14
See application file for complete search history.

(56) References Cited

U.S. PATENT DOCUMENTS 4,285,545 A * 8/1981 Protze ................... 297/483
4,321,979 A * 3/1982 Kuroyama et al. ......... 180/268
4,410,061 A * 10/1983 Terabayashi ............... 180/268
5,149,133 A * 9/1992 Alvarado .................. 280/804
6,935,456 B1 * 8/2005 Korechika et al. ......... 180/268
2006/0042850 A1 * 3/2006 Mendis ..................... 180/268

* cited by examiner

Primary Examiner—Faye M. Fleming
(74) Attorney, Agent, or Firm—K. S. Cornaby

(57) ABSTRACT

A belt deflector for the seat belt of a front seat in an automotive vehicle, more specifically in a cabriolet or coupé-type automotive vehicle, said belt deflector comprising a movable beam (28) that has a deflection portion (50) for the shoulder belt portion (46) of a seat belt, a base member (30) comprising a) securing means for securing it in the side region (22) of a bodywork, behind a front door and beneath a bodywork line (24) that is defined by the lower edges of the side window recesses, and forming b) a guide for the movable beam (28) so that the movable beam (28) is guided between a lower at-rest position and an upper position in which upper position the deflection portion (50) is located above the bodywork line (24), a drive (36) for the beam (28) which is movable relative to the base member (30), a control unit being associated with the drive (36) and a crash sensor that is responsive to crash acceleration of the automotive vehicle and triggers the control unit so that the drive (36) causes the movable beam (28) to move from the at-rest position to the upper position.

12 Claims, 3 Drawing Sheets

BELT DEFLECTOR FOR A SEAT BELT IN AN AUTOMOTIVE VEHICLE, MORE SPECIFICALLY IN A CABRIOLET OR A COUPE

The invention relates to a deflector for deflecting the seat belt of a front seat in an automotive vehicle. The invention is more specifically directed to cabriolet or coupé-type automotive vehicles. Put another way, the invention more specifically relates to automotive vehicles the side windows of which are not separated by what is termed a B-pillar.

In automotive vehicles having a B-pillar, a belt deflector for the shoulder belt portion is typically located on or in the B-pillar at a height slightly above the shoulder height of a driver or a front-seat passenger. In cabriolet or coupé-type vehicles, generally in vehicles without a B-pillar, the shoulder belt portion usually is deflected in the side region of the bodywork. A deflector is located on the upper edge of the side region, behind a front door. It is located on a bodywork line that defines the upper edge of the hard bodywork. The bodywork line is defined by the lower edges of the window recesses and is normally located beneath the shoulder height of a driver or a front-seat passenger. Accordingly, the belt, which takes departure from this belt deflector, is first oriented upward until it reaches the shoulder of the driver or of the front-seat passenger from where it is running downward toward the belt buckle. The shoulder is the highest point. This belt arrangement is disadvantageous.

The term front door is to be construed herein as the door that is associated to either the front-seat passenger or the driver. The term will also be used for so-called two-door cars in which the back seats have no door of their own.

This is where the invention steps in. It is the object of the invention to provide for a belt deflector for vehicles, more specifically for vehicles without a B-pillar, which, in the event of a crash, that is when the seat belt has to prove effective, permits to have the belt deflection point located at least on the height of the driver's or of the front-seat passenger's shoulder, if possible even higher, but which, in normal driving conditions and more specifically in the non-driving condition, will not be visually noticeable, will not break the bodywork line and will, as a result thereof, not affect the appearance of the vehicle.

This object is solved by a belt deflector for the seat belt of a front seat of an automotive vehicle, more specifically of a cabriolet or coupé-type automotive vehicle, said belt deflector comprising a movable beam that has a deflection portion for deflecting the shoulder belt portion of a seat belt; a base member comprising a) securing means for securing it in the side region of a bodywork, behind a front door and beneath a bodywork line that is defined by the lower edges of the side window recesses, and forming b) a guide for the movable beam so that the movable beam is guided between a lower at-rest position and an upper position in which upper position the deflection portion is located above the bodywork line; a drive for the beam which is movable relative to the base member, a control unit being associated with the drive; and a crash sensor that is responsive to crash acceleration of the automotive vehicle and triggers the control unit so that the drive causes the movable part to move from the at-rest position to the upper position.

In this belt deflector, the movable beam has at least two positions, namely 1) an at-rest position and 2) at least one raised, extended or upper position. It will only adopt this last position on the very onset of a crash and will remain there during the crash. This will happen automatically under the control of the crash sensor. Otherwise, the movable beam is always located beneath the bodywork line and is not apparent as a result thereof. Then, the automotive vehicle is no different from a prior art automotive vehicle in which the belt deflector for the shoulder belt portion is secured in the side region of the bodywork, viz. in the region of the bodywork's line.

This provides the invention with the great advantage that the visual appearance of the vehicle remains unchanged over prior art vehicles, while the vehicle considerably gains in safety since, in the event of a crash, the movable beam is caused to rise and to displace the belt deflection portion to where it is usually provided for in vehicles having a B-pillar. As compared to normal limousines, in which the belt deflection point is located on the B-pillar and is accordingly high, the invention provides the additional advantage that the seat belt is tensioned by the upward moving movable beam. As a result, the belt will have a better fit. So far, the effect obtained is similar to that achieved with a belt tensioner. Preferably, a separate belt tensioning device may be absent. The invention is also suited for use in automotive vehicles in which, for reasons of appearance, one would like to configure the B-pillar to be narrow so that the window area be broken to the least possible extent or if for other reasons one would prefer not to have the belt being deflected on a B-pillar.

In an accident situation, the drive of the belt deflector is enabled by the control unit. The drive causes the movable beam to move upward until it reaches the upper position. This happens within a period of time that is adapted to the usual time intervals occurring between the crash sensor's response and the crash acceleration of a driver or of a front-seat passenger, e.g., within 20 ms. The drive has to operate at a sufficiently fast speed such that, when the tension in the seat belt becomes noticeable, the movable beam has already reached its raised position. This is generally achieved using a propellant, for example a powder charge or a propellant gas supplied from a compressed gas bottle. It is however also possible to use an electric motor as long as it causes the movable beam to travel upward fast enough. A pretensioned mechanical spring may also be used, said spring being at first retained in its biased condition by a means, an electrically fusible wire for example. Other alternative configurations of the drive are possible.

Preferably, the crash sensor utilized is the sensor that is provided anyway in the automotive vehicle. Accordingly, no separate crash sensor is needed for the belt deflector. What may be necessary though is a controller or another add-on unit for amplifying the signal delivered by the crash sensor to such an extent that it causes a wire to fuse.

It has been found that the belt deflector of the invention is particularly advantageous when combined with a belt feeding device as it is known from U.S. Pat. No. 4,175,633. Such type belt feeding devices may be disposed in the side region of the bodywork, behind a front door and beneath the bodywork's line. They may use the same outlet port in the upper edge of the side region as used by the belt deflector and its movable beam. It is thereby very advantageous that task and functions of these two units may be optimally separated. The belt deflector is needed only when the belt is worn. It is the very task of the belt feeding device to make this easier. The belt feeding device should only be used in the non-driving condition of the vehicle, prior to starting, whereas the deflector is only needed in the driving condition. The belt deflector only makes sense when the belt is worn. Accordingly, the control circuit may be programmed such that the movable carrier is only allowed to leave its at-rest position when the seat belt is worn, that is when the tongue is inserted into the belt buckle.

In principle, the invention is also suited for four-door automotive vehicles. The belt deflector may be disposed in the pillar left between the two side doors so as to occupy relatively little space. If a belt feeding device is added, it may be disposed substantially vertically as is the case with the belt feeding device in accordance with U.S. Pat. No. 4,629,214.

Further advantages and characteristics of the invention will become apparent from the remaining claims and from the following non restrictive description of the embodiments thereof, given by way of example only with reference to the drawings in which:

Figure 1:
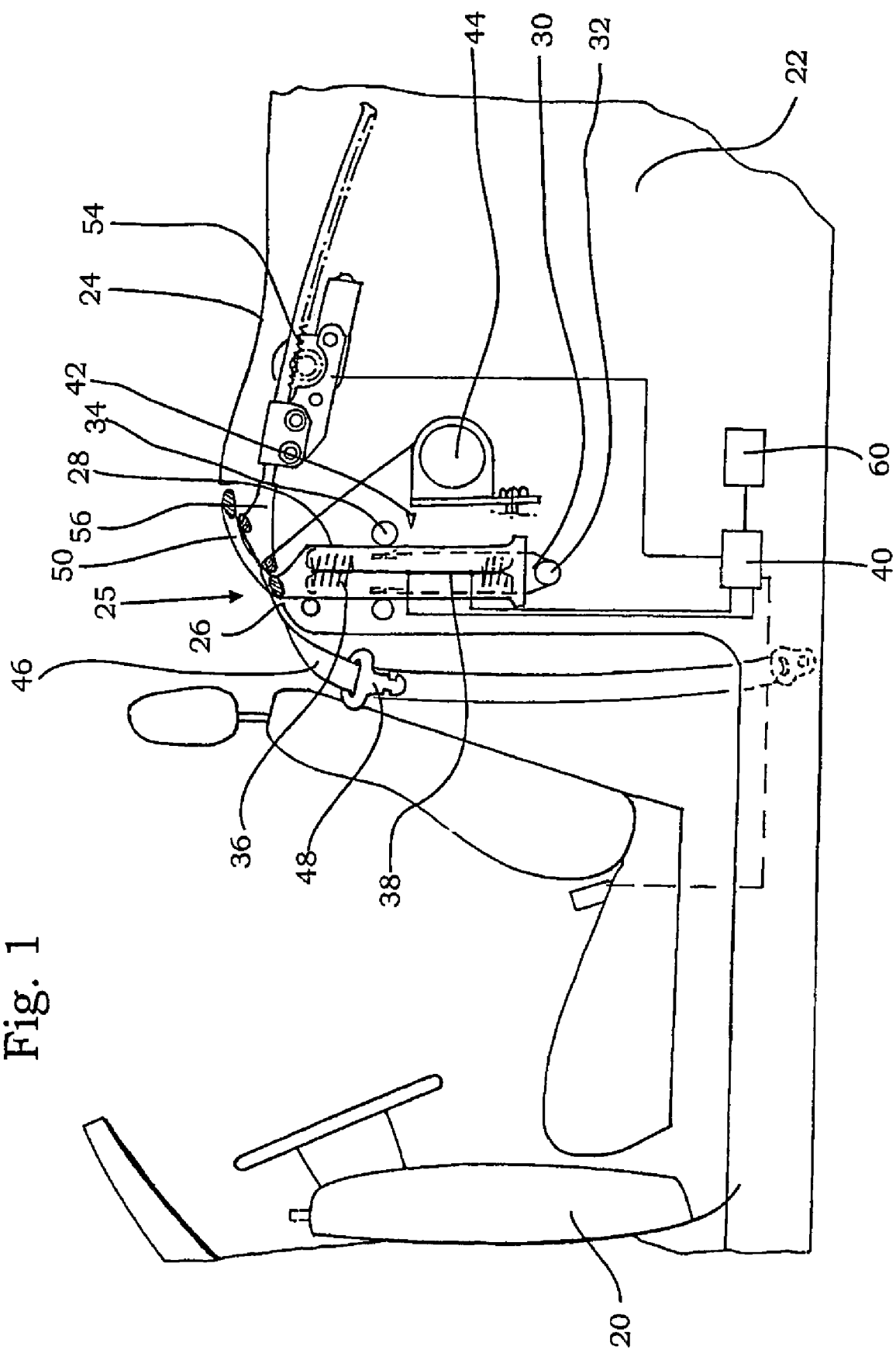
FIG. 1 is a schematic side view of those portions of the automotive vehicle that are pertinent to the invention with the belt deflector being in the at-rest position.
Figure 2:
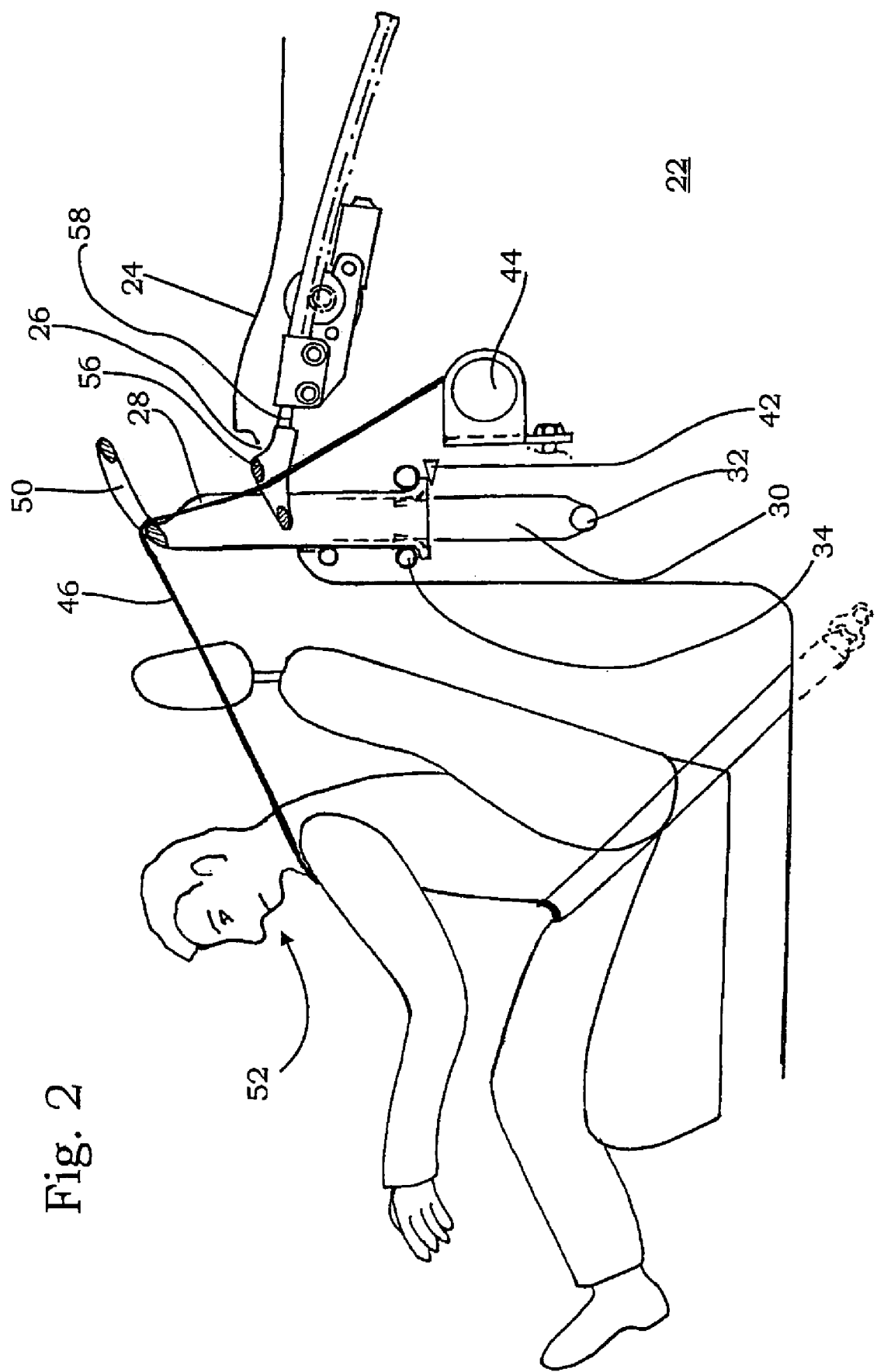
FIG. 2 is a view like FIG. 1 with the movable beam of the belt deflector being in its raised position.

The FIGS. 1 and 2 are schematic views illustrating a two-door automotive vehicle with the driver's door 20 (FIG. 1) being open and having, behind (seen in normal driving direction) said door, a side region. The driver's door 20 is a front door. It is associated with a door cutout. The automotive vehicle further has a bodywork's line 24 which is defined by the boundary usually formed by the lower edges of the side window recesses.

A belt deflector 25 is accommodated behind (at the side of) the door recess, beneath the bodywork's line 24 and in the side region 22. It is associated with an opening 26 provided in the top end of the side region 22. The belt deflector 25 has a movable beam 28 that is capable of being moved upward through said opening 26, as will be explained hereinafter. The belt deflector 25 further has a base member 30 that is connected with the side region 22, this connection being performed by means of connecting means 32 in the FIGS. 1 and 2.

In the FIGS. 1 and 2, the movable beam 28 is an outer part and the base member 30 is located within movable beam 28. Guide means 34 in the form of three rollers are additionally secured in the side region 22, said rollers abutting on the outer side of the movable beam 28 for additional guidance thereof. They are a component part of the base member 30.

Between the movable beam 28 and the base member 30 there is disposed a drive 36 which, in the exemplary embodiment shown, is configured to be a biased helical spring. It is entirely located within the arrangement consisting of the base member 30 and the movable beam 28. A fusible wire 38 joins the two ends of said spring together and maintains the spring in its biased condition. The fusible wire 38 is connected to a control unit 40. The control unit 40 can deliver a voltage pulse that will soften the fusible wire 38—in a way similar to that of a wire in an electric fuse—to such an extent as to allow it to tear. Then, the spring drives the movable beam 28 from its at-rest position shown in FIG. 1 into the upper position shown in FIG. 2. In this exemplary embodiment, the movable beam 28 has two projections provided on its lower end, said projections coming to rest against the two lower rollers constituting the guide means 34. This permits to stop the upward movement of the movable beam 28, see FIG. 2. The spring maintains the movable beam 28 in the upper position. There is additionally provided a catch 42 that automatically snap-fits and secures the upper position, thus keeping the movable beam in the upper position even upon experiencing crash forces. Other retaining means for securing the upper position are possible.

Beside the belt deflector, an automatic belt tensioner 44 is disposed in the side region 22. The shoulder belt portion 46 of a seat belt takes departure therefrom and extends as far as an insertion part 48 from where it runs in the form of a lap belt toward an end that is laterally secured on the bodywork. Behind the automatic belt tensioner 44, the shoulder belt portion 46 passes through a deflection portion 50 that is for example U-shaped or O-shaped and is located at the uppermost end of the movable beam 28. At the same time, it is configured so as to cover the opening 26.

As long as the movable beam 28 is in its at-rest position, the deflection portion 50 is on the same height as the bodywork's line 25, this condition being illustrated in FIG. 1. When the movable beam 28 is in its upper position, the deflection portion 50 is located higher than the shoulder height of a driver 52. The driver 52 shown in FIG. 2 is in an accident situation and is restrained by the seat belt.

In the exemplary embodiment shown, the movable beam 28 is caused to move substantially vertically. The base member 30 may be inclined e.g., up to ±30°. The movable beam 28 with its deflection portion 50 and the base member 30 with the guide means 34 associated with the base member are configured such that in the upper position shown in FIG. 2 the belt deflector is capable of taking the occurring crash forces. It is thereby very advantageous if the belt deflector deforms selectively, thereby absorbing energy. It only matters that it remains in substantially the same position. If it were to fail completely, the belt would no longer be deflected as shown in FIG. 2, but the seat belt would still fit on the driver 52.

Parallel to the bodywork's line 24 there is further provided a belt feeding device 54 in the side region 22. Known constructions may be used therefore. What matters is that the belt feeding device 54 is capable of cooperating with the belt deflection unit 25, more specifically in the deflection portion 50. For this purpose, the annularly configured deflection portion 50 forms, thanks to its inclined position and its free cross-section, a sufficiently large clear opening so that a front part 56 of the belt feeding device 54 is allowed to engage through said opening. The front part 56, in turn, is configured such that it guides the shoulder belt portion 46 on the one side and that it partially closes the opening 26 on the other side when the movable beam 28 is at-rest and when the belt feeding device 54 is in the retracted zero position shown in the FIGS. Accordingly, the front part 56 and the deflection portion 50 cooperate so as to spare but a small outlet slot for the shoulder belt portion 46 while the opening 26 is normally covered. The front part 56 is located beneath the deflection portion 50 and outside of the movable beam 28 in such a manner that it does not hinder the movement of the movable beam 28 as long as it remains in the zero position.

The control unit 40 is connected to a crash sensor that may also be used for other functions within the automotive vehicle, for example for enabling airbags. The crash sensor 60 triggers the control unit 40 and more specifically supplies the control unit 40 with a signal in the event of a crash. If necessary, said control unit amplifies the signal and delivers, via two lines that are connected to the fusible wire 38, a voltage pulse that causes the fusible wire 38 to be destroyed. As a result thereof, the biased helical spring, which forms the drive 36, is allowed to slacken and to bring the movable beam 28 from the position shown in FIG. 1 into the position according to FIG. 2. The shoulder belt portion 46 is thereby tensioned; it is guided so as to deflect.

The control unit 40 is moreover responsible for the belt feeding device 54. It makes certain that the belt feeding device 54 and the belt deflection unit 25 will not collide. Various sensors inform the control unit 40 about the condition of the vehicle. A dashed line shows a connection with a sensor provided in a belt buckle 62. Sensors may be similarly disposed on the engine and so on. As a result, the control unit 40 is informed about the seat belt being worn by the corresponding signal which is delivered by the sensor mounted on the belt buckle 62. Control unit 40 also receives information as to whether ignition is switched on and so on. The drive 36 is preferably only started when the belt is worn and the ignition switched on. Further inquiries such as weight detection on the driver's seat, speed detection and so on are possible.

Figure 3:
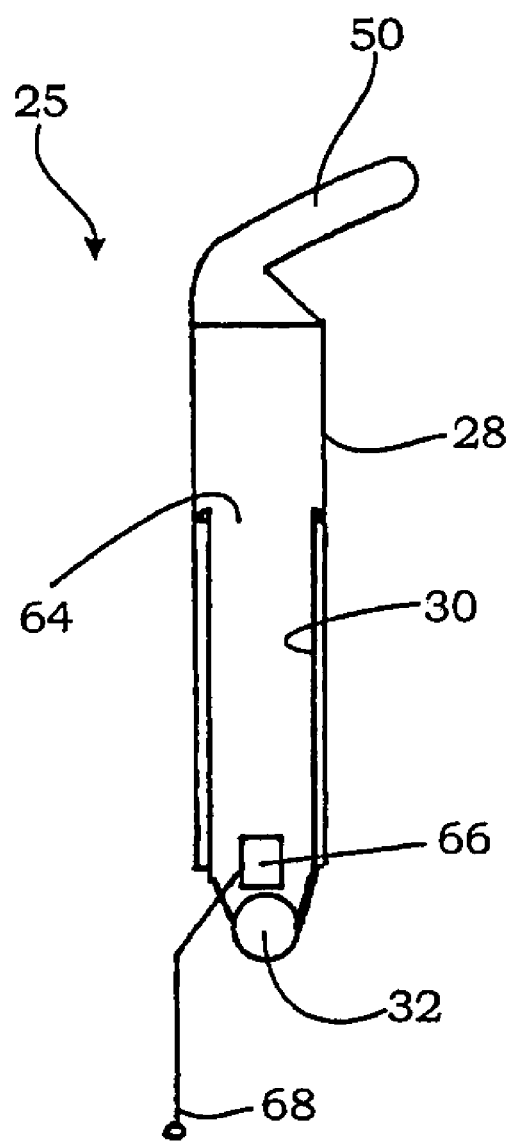
FIG. 3 is a schematic illustration of a belt deflector with a powder propellant.
Figure 4:
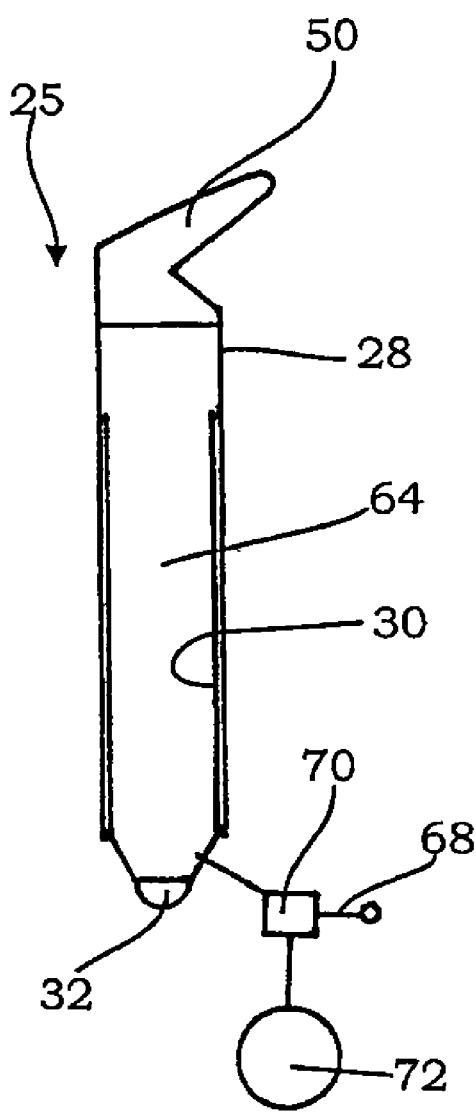
FIG. 4 is a schematic view of a belt deflector with a compressed gas bottle.

The FIGS. 3 and 4 show other implementations for driving the belt deflector 25. In the implementation shown in FIG. 3, the base member 30 is located within the movable beam 28, both defining a substantially airtight inner space 64. A powder propellant 66 is also located therein. Said propellant can be ignited by an electric signal that is supplied by control unit 40 via a line 68. Upon ignition of the powder propellant 66, the generated gases urge the movable beam 28 to move upward into the position shown in FIG. 2.

In the implementation shown in FIG. 4, the movable beam 28 and the base member 30 again define a substantially tight inner space 64. Said inner space communicates via a line with a valve 70 that in turn is connected to a compressed gas tank 72. The valve can be opened by a signal which is delivered by control unit 40 via line 68. Once opened, the high pressure gas flows out of the compressed gas tank 72 into the inner space 64, thereby inducing the movable beam 28 to quickly move upward.

The invention claimed is:

1. A belt deflector for a seat belt of a front seat in an automotive vehicle, said belt deflector comprising:
   a movable beam having a deflection portion for a shoulder belt portion of the seat belt;
   a base member comprising a) securing means for securing the base member in a side region of a bodywork, at the side of a front door and under a bodywork line which bodywork line is defined by lower edges of a side window recess, said base member forming b) a guide for the movable beam, the movable beam being guided between a lower at-rest position and an upper position in which upper position the deflection portion is located above the bodywork line,
   a drive for the beam which drive is movable relative to the base member, a control unit being associated with the drive; and
   a crash sensor being responsive to a crash acceleration of the automotive vehicle and triggering the control unit, in an event of triggering the drive causes the movable beam to move from the at-rest position to the upper position.

2. The belt deflector in accordance with claim 1, wherein the drive comprises at least one of a powder propellant, a pretensioned spring, an electric motor or a compressed gas bottle.

3. The belt deflector in accordance with claim 1, wherein a belt feeding device is additionally provided which belt feeding device is disposed in proximity to the belt deflector and, like the belt deflector, is located in the side region of the bodywork, at the side of the front door and beneath the bodywork line and comprises a belt payout region through which belt payout region the shoulder belt portion of the seat belt is allowed to pass.

4. A belt deflector with a belt feeding device in accordance with claim 3, wherein the belt feeding device has a feeding rod and wherein the feeding rod is inclined relative to the bodywork line at a small angle.

5. The belt deflector in accordance with claim 1, wherein the movable beam forms a cover member which cover member is arranged in the deflection portion of the movable beam, said cover member covering an opening in the side region of the bodywork when the movable beam is in its at-rest position and comprising an outlet for the shoulder belt portion.

6. The belt deflector and the belt feeding device in accordance with the claim 5, wherein the outlet is configured such that, when the movable beam is in its at-rest position, the feeding rod is allowed to engage its front part through the outlet.

7. The belt deflector and belt feeding device in accordance with claim 6, wherein a control circuit is provided for the belt feeding device and for the deflector, said control circuit being configured such that the release of the belt deflector can only be actuated when the belt feeding device is in a retracted zero position.

8. The belt deflector in accordance with claim 1, wherein the movable beam surrounds the base member.

9. The belt deflector in accordance with claim 1, wherein the movable beam and the base member are hollow inside and wherein the movable beam and the base member define an interior space that is substantially airtight.

10. The belt deflector in accordance with claim 1, wherein a locking means is provided retaining the movable beam in an upper position of the movable beam.

11. The belt deflector in accordance with claim 1, wherein the automobile is a cabriolet or coupé-type automotive vehicle.

12. The belt deflector with a belt feeding device in accordance with claim 3, wherein the belt feeding device has a feeding rod that is inclined to the bodywork line at an angle of less than 20°.

* * * * *